(12) United States Patent
Serven et al.

(10) Patent No.: US 8,083,482 B2
(45) Date of Patent: Dec. 27, 2011

(54) METHOD AND SYSTEM FOR LIMITING BLADE PITCH

(75) Inventors: Mark Serven, Hackettstown, NJ (US); Ronald W. Rapp, Newton, NJ (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 753 days.

(21) Appl. No.: 12/241,909

(22) Filed: Sep. 30, 2008

(65) Prior Publication Data
US 2010/0080704 A1 Apr. 1, 2010

(51) Int. Cl.
*B63H 3/00* (2006.01)
*B64C 11/00* (2006.01)
*F03D 9/00* (2006.01)

(52) U.S. Cl. .............................. 416/61; 416/153; 290/55

(58) Field of Classification Search .............. 416/1, 140, 416/61, 169 R, 152, 153, 163, 27, 30; 290/49, 290/55
See application file for complete search history.

(56) References Cited

U.S. PATENT DOCUMENTS

| | | | |
|---|---|---|---|
| 3,902,822 A | 9/1975 | Andrews et al. | |
| 3,922,852 A | 12/1975 | Drabek | |
| 3,981,186 A | * 9/1976 | Rauch et al. | ................ 73/152.48 |
| 3,994,128 A | 11/1976 | Griswold, Jr. et al. | |
| 4,047,842 A | 9/1977 | Avena et al. | |
| 4,160,170 A | 7/1979 | Harner et al. | |
| 4,339,666 A | 7/1982 | Patrick et al. | |
| 4,523,891 A | 6/1985 | Schwartz et al. | |
| 4,533,296 A | 8/1985 | Duchesneau et al. | |
| 4,656,362 A | 4/1987 | Harner et al. | |
| 4,657,484 A | 4/1987 | Wakeman et al. | |
| 4,750,862 A | 6/1988 | Barnes et al. | |
| 5,199,850 A | 4/1993 | Carvalho et al. | |
| 5,282,719 A | 2/1994 | McCarty et al. | |
| 5,481,648 A | 1/1996 | Volponi et al. | |
| 5,779,446 A | 7/1998 | Althof et al. | |
| 6,071,076 A | 6/2000 | Ansari et al. | |
| 6,592,328 B1 | 7/2003 | Cahill | |
| 6,672,835 B1 | 1/2004 | Hughes | |

FOREIGN PATENT DOCUMENTS
EP 0684365 A2 11/1995

OTHER PUBLICATIONS

An International Search Report (PCT/ISA/210) for copending International Application No. PCT/US2009/056487, filed Sep. 10, 2009 (4 pages).

* cited by examiner

*Primary Examiner* — Thomas L Dickey
*Assistant Examiner* — Nikolay Yushin
(74) *Attorney, Agent, or Firm* — David J. Clement, Esq.; Armstrong Teasdale LLP

(57) ABSTRACT

A method for limiting blade pitch is provided. The method includes providing a brake assembly that is actuatable to limit blade pitch, providing a limit stop assembly including a stop wheel and a traveler movable relative to the stop wheel, and coupling the limit stop assembly to the brake assembly such that the limit stop assembly actuates the brake assembly when the traveler engages the stop wheel.

18 Claims, 2 Drawing Sheets

METHOD AND SYSTEM FOR LIMITING BLADE PITCH

BACKGROUND OF THE INVENTION

The field of this disclosure relates generally to blades and, more particularly, to a method and a system for limiting blade pitch.

Many known gas turbine engines include a fan assembly that increases engine thrust. Specifically, fan blade pitch directly affects the magnitude of the engine thrust or reverse thrust, and many pilots use a pitch adjustment system to facilitate controlling the aircraft during flight.

At least some known pitch adjustment systems have an electro-mechanical actuation assembly that adjusts blade pitch within either a flight range (i.e., a thrust pitch range) or a ground range (i.e., a reverse thrust pitch range). Because many known electro-mechanical actuation assemblies depend on an electronic control loop to maintain blade pitch within a given range (i.e., to maintain pitch within either the flight range or the ground range), a reliable back-up system for limiting blade pitch would be beneficial to facilitate assisting the pitch adjustment system with maintaining blade pitch within the given range.

BRIEF DESCRIPTION OF THE INVENTION

In one aspect, a method for limiting blade pitch is provided. The method includes providing a brake assembly that is actuatable to limit blade pitch, providing a limit stop assembly including a stop wheel and a traveler movable relative to the stop wheel, and coupling the limit stop assembly to the brake assembly such that the limit stop assembly actuates the brake assembly when the traveler engages the stop wheel.

In another aspect, a system for limiting blade pitch is provided. The system includes a brake assembly that is actuatable to limit blade pitch. The system also includes a limit stop assembly including a stop wheel and a traveler movable relative to the stop wheel, wherein the limit stop assembly is coupled to the brake assembly such that the limit stop assembly actuates the brake assembly when the traveler engages the stop wheel.

DETAILED DESCRIPTION OF THE INVENTION

The following detailed description illustrates exemplary methods and systems for limiting blade pitch by way of example and not by way of limitation. The description enables one of ordinary skill in the art to make and use the disclosure, and the description describes several embodiments, adaptations, variations, alternatives, and uses of the disclosure, including what is presently believed to be the best mode of carrying out the disclosure. The disclosure is described herein as being applied to a preferred embodiment, namely, methods and systems for limiting fan blade pitch in a gas turbine engine. However, it is contemplated that this disclosure has general application to limiting blade pitch in a broad range of systems and in a variety of industrial and/or consumer applications.

Figure 1:
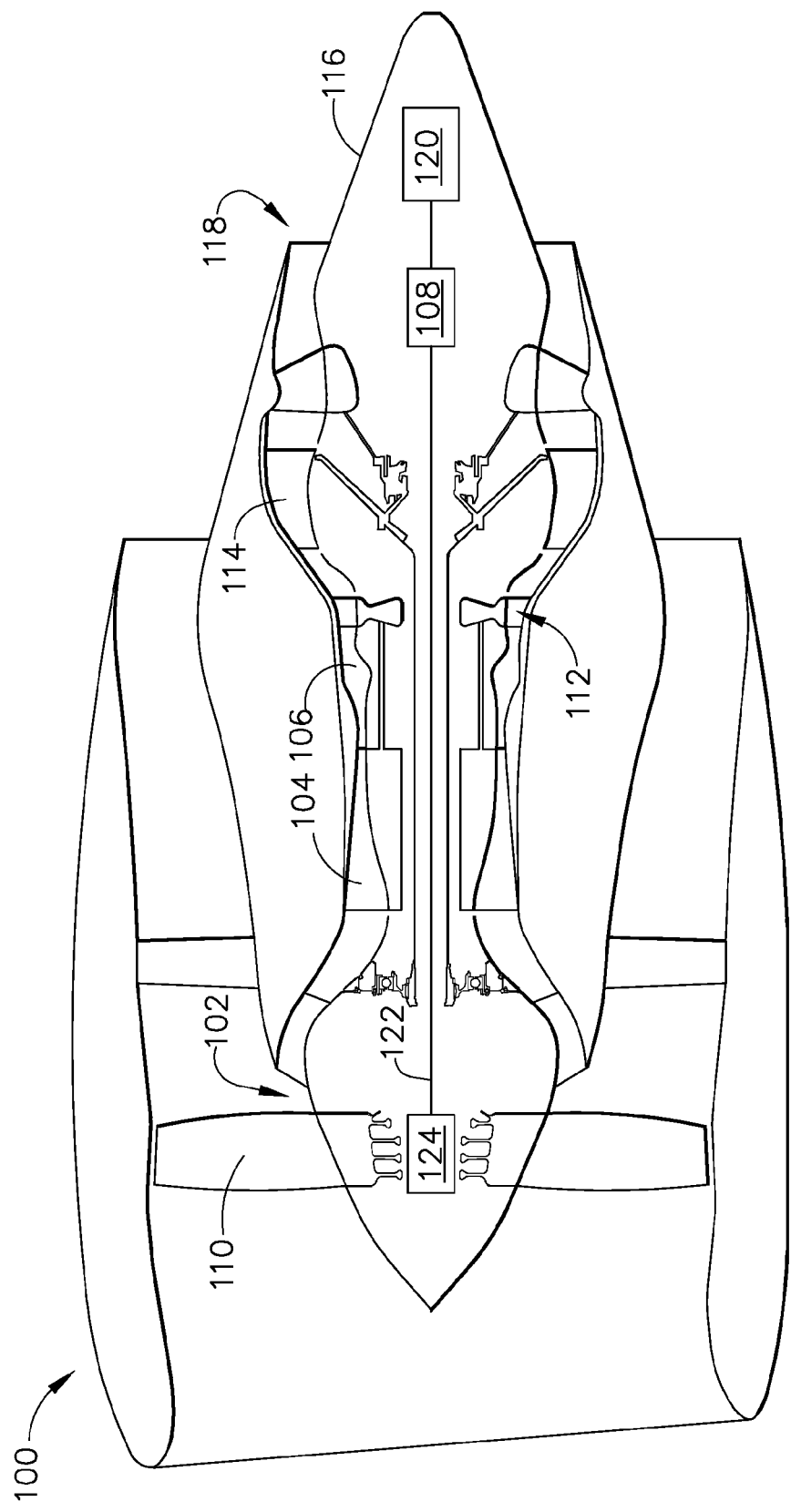
FIG. 1 is a schematic illustration of a gas turbine engine.

FIG. 1 is a schematic illustration of a gas turbine engine 100 that includes a fan assembly 102, a high pressure compressor 104, and a combustor 106. Engine 100 also includes a high pressure turbine 112, a low pressure turbine 114, and a fixed housing 116 extending through a central portion of engine 100. In the exemplary embodiment, fan assembly 102 is ducted and includes a plurality of blades 110. In other embodiments, fan assembly 102 may be unducted. In operation, air flows through fan assembly 102, and compressed air is supplied from fan assembly 102 to high pressure compressor 104. The highly compressed air is delivered to combustor 106. Airflow from combustor 106 drives rotating turbines 112 and 114 and exits gas turbine engine 100 through an exhaust system 118.

In the exemplary embodiment, engine 100 also includes a pitch adjustment system 108 coupled in driving engagement with fan assembly 102 across a pitch adjustment shaft 122 and a pitch adjustment gear assembly 124. Pitch adjustment system 108 rotates pitch adjustment shaft 122 to facilitate driving pitch adjustment gear assembly 124 and adjusting a pitch of blades 110. In the exemplary embodiment, engine 100 also includes a pitch limiting system 120 coupled to pitch adjustment shaft 122 within fixed housing 116 to facilitate limiting a pitch of blades 110 by limiting a rotation of pitch adjustment shaft 122, as described more fully below.

Figure 2:
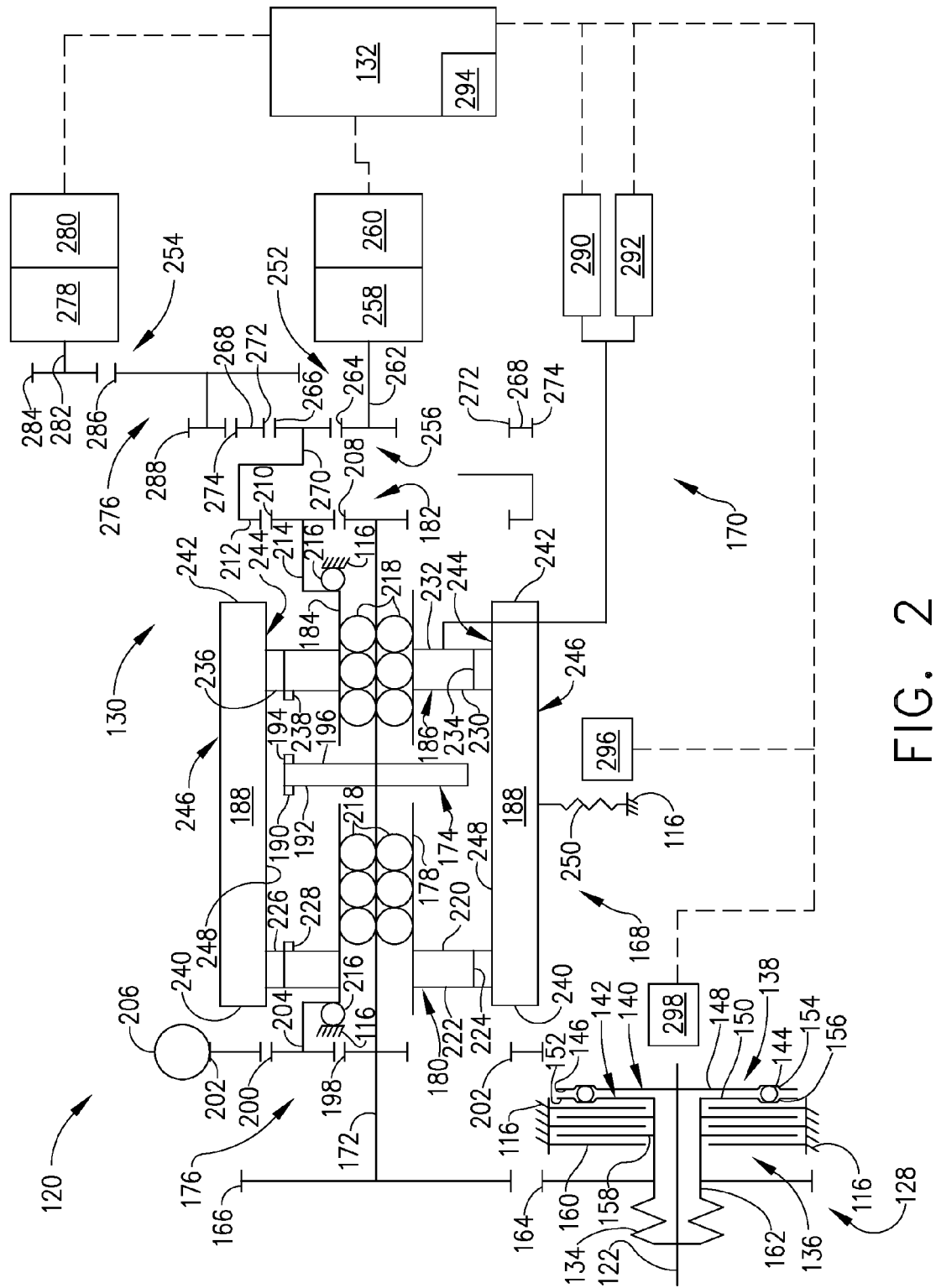
FIG. 2 is a schematic illustration of a pitch limiting system for use with the gas turbine engine shown in FIG. 1.

FIG. 2 is a schematic illustration of pitch limiting system 120. In the exemplary embodiment, pitch limiting system 120 includes a brake assembly 128, a stop assembly 130, and a system controller 132. Brake assembly 128 is coupled to pitch adjustment shaft 122 to facilitate limiting a rotation of pitch adjustment shaft 122, thereby limiting a pitch of blades 110. Alternatively, brake assembly 128 may be coupled, directly or indirectly, to pitch adjustment shaft 122 in any manner that enables pitch limiting system 120 to function as described herein.

Brake assembly 128 includes a biasing mechanism 134, a brake 136, and a torque transfer unit 138. In the exemplary embodiment, torque transfer unit 138 includes a first transfer disc 140, a second transfer disc 142, and a plurality of transfer balls 144. First transfer disc 140 has a first face 146 and a second face 148, and second transfer disc 142 has a first face 150 and a second face 152. First transfer disc 140 and second transfer disc 142 are spaced apart such that first transfer disc first face 146 opposes second transfer disc first face 150. Additionally, a set of first grooves 154 is defined in first transfer disc first face 146, and a set of second grooves 156 is defined in second transfer disc first face 150. In the exemplary embodiment, each groove 154, 156 is generally arcuate in shape and is formed with at least one inclined sidewall. First transfer disc 140 and second transfer disc 142 are oriented such that each first groove 154 has an opposing second groove 156. At least one transfer ball 144 is positioned between each first groove 154 and second groove 156 to facilitate transferring a torque between first transfer disc 140 and second transfer disc 142 when one of first transfer disc 140 and second transfer disc 142 is rotated relative to the other.

Brake 136 includes a plurality of annular rotor plates 158 and a plurality of annular stator plates 160. Stator plates 160 are spaced apart from one another and are coupled to housing 116 (e.g., via either a splined engagement or a keyed engagement) such that each stator plate 160 is movable axially along housing 116, and each rotor plate 158 is coupled to a torque transfer shaft 162 (e.g., via either a splined engagement or a keyed engagement) such that each rotor plate 158 is movable axially along torque transfer shaft 162 and is rotatable together with torque transfer shaft 162 between adjacent stator plates 160. In the exemplary embodiment, biasing mechanism 134 is an annular spring coupled in biasing engagement with second transfer disc 142 to impart a predetermined load on second transfer disc 142, urging second transfer disc 142 toward first transfer disc 140. Alternatively, biasing mechanism 134 may be any device that enables brake assembly 128 to function as described herein. In the exemplary embodiment, pitch adjustment shaft 122 is either coupled to or formed with first transfer disc 140 such that first transfer disc 140 is rotatable together with pitch adjustment shaft 122. Additionally, torque transfer shaft 162 is either coupled to or formed with second transfer disc 142 and a first spur gear 164 such that torque transfer shaft 162 extends between second transfer disc 142 and first spur gear 164 and concentrically about pitch adjustment shaft 122 to facilitate rotating second transfer disc 142 and first spur gear 164 together with torque transfer shaft 162 and independently of pitch adjustment shaft 122.

In the exemplary embodiment, stop assembly 130 includes a second spur gear 166, a limit stop assembly 168, and a limit adjustment assembly 170 that are coupled together via an input shaft 172. Limit stop assembly 168 includes a stop wheel 174, a first planetary gear set 176, a first lead screw 178, a first traveler 180, a second planetary gear set 182, a second lead screw 184, a second traveler 186, and a guide tube 188. In alternative embodiments, limit stop assembly 168 may include any number of gear sets, travelers, lead screws, stop wheels, and/or guide tubes that enable limit stop assembly 168 to function as described herein.

Stop wheel 174 is a generally annular disc that has at least one first stop lug 190 extending from a first face 192 and at least one second stop lug 194 extending from a second face 196. Stop wheel 174 is fixedly coupled to input shaft 172 such that stop wheel 174 is rotatable with input shaft 172.

First planetary gear set 176 includes a first sun gear 198, a plurality of first planet gears 200, a first ring gear 202, and a first planet carrier 204. First sun gear 198 is fixedly coupled to input shaft 172 for rotation therewith, and first planet gears 200 are coupled about first sun gear 198 in driving engagement with first sun gear 198. First ring gear 202 is coupled about first planet gears 200 in driving engagement with first planet gears 200, and first planet carrier 204 is coupled to first planet gears 200 such that first planet carrier 204 is rotatable with first planet gears 200. First planetary gear set 176 also includes a worm gear set 206 coupled in driving engagement with first ring gear 202 to facilitate manually rotating first ring gear 202. Worm gear set 206 also facilitates grounding first ring gear 202 to housing 116, thereby preventing rotation of first ring gear 202 during rotation of first sun gear 198. In the exemplary embodiment, first planetary gear set 176 is operable as a gear differential to facilitate a trim adjustment operation by manually rotating first ring gear 202 via worm gear set 206 to locate first traveler 180 at a desired position, as described more fully below.

Second planetary gear set 182 includes a second sun gear 208, a plurality of second planet gears 210, a second ring gear 212, and a second planet carrier 214. Second sun gear 208 is fixedly coupled to input shaft 172 for rotation therewith, and second planet gears 210 are coupled about second sun gear 208 in driving engagement with second sun gear 208. Second ring gear 212 is coupled about second planet gears 210 in driving engagement with second planet gears 210, and second planet carrier 214 is coupled to second planet gears 210 such that second planet carrier 214 is rotatable with second planet gears 210. In the exemplary embodiment, second planetary gear set 182 functions as a gear differential to facilitate locating second traveler 186 at a desired position, as described more fully below.

First lead screw 178 is coupled to first planet carrier 204 and concentrically about input shaft 172 such that first lead screw 178 extends from first planet carrier 204 toward stop wheel 174. Second lead screw 184 is coupled to second planet carrier 214 and concentrically about input shaft 172 such that second lead screw 184 extends from second planet carrier 214 toward stop wheel 174. First lead screw 178 and second lead screw 184 are spaced apart from input shaft 172 and from stop wheel 174 such that first lead screw 178 and second lead screw 184 are independently rotatable relative to one another, relative to input shaft 172, and relative to stop wheel 174. In the exemplary embodiment, first lead screw 178 is coupled to first planet carrier 204 via a splined engagement, and/or second lead screw 184 is coupled to second planet carrier 214 via a splined engagement. In one embodiment, first lead screw 178 and/or second lead screw 184 is rotatably coupled to housing 116 via a plurality of axial support bearings 216 and/or is rotatably coupled to input shaft 172 via a plurality of radial support bearings 218 to facilitate supporting and aligning first lead screw 178 and/or second lead screw 184 relative to input shaft 172 and/or housing 116.

First traveler 180 includes a first face 220, a second face 222, and an annular peripheral face 224 extending between first face 220 and second face 222. In one embodiment, a plurality of first external splines 226 are formed on peripheral face 224 and extend from first face 220 to second face 222, and at least one first traveler lug 228 is either coupled to or formed on first face 220. First traveler 180 is threadably coupled to first lead screw 178 such that first traveler 180 is movable along first lead screw 178 either toward or away from stop wheel 174.

Second traveler 186 includes a first face 230, a second face 232, and an annular peripheral face 234 extending between first face 230 and second face 232. In one embodiment, a plurality of second external splines 236 are formed on peripheral face 234 and extend from first face 230 to second face 232, and at least one second traveler lug 238 is either coupled to or formed on first face 230. Second traveler 186 is threadably coupled to second lead screw 184 such that second traveler 186 is movable along second lead screw 184 either toward or away from stop wheel 174.

Guide tube 188 is positioned concentrically about first traveler 180, stop wheel 174, and second traveler 186. Guide tube 188 comprises a first end 240, a second end 242, an inner surface 244, and an outer surface 246. Inner surface 244 comprises a plurality of internal splines 248 formed therewith and extending from first end 240 to second end 242. First traveler 180 is coupled against inner surface 244 such that first external splines 226 engage internal splines 248 to facilitate guiding first traveler 180 either towards or away from stop wheel 174 and preventing rotation of first traveler 180 when first lead screw 178 is rotating. Second traveler 186 is coupled against inner surface 244 such that second external splines 236 engage internal splines 248 to facilitate guiding second traveler 186 either towards or away from stop wheel 174 and preventing rotation of second traveler 186 when second lead screw 184 is rotating. In the exemplary embodiment, stop wheel 174 is spaced apart from guide tube inner surface 244 such that stop wheel 174 is rotatable together with input shaft 172 within guide tube 188. In the exemplary embodiment, guide tube 188 is fixedly coupled to housing 116, in part, via a stop cushion spring 250 that facilitates absorbing inertial energy transmitted to guide tube 188 when either first traveler 180 or second traveler 186 engages stop wheel 174 (i.e., when either first traveler lug 228 or second traveler lug 238 engages first stop lug 190 or second stop lug 194, respectively). In an alternative embodiment, guide tube 188 is supported within housing 116 via a plurality of bushings (not shown) to facilitate preventing movement of guide tube 188 relative to housing 116.

In the exemplary embodiment, limit adjustment assembly 170 includes a first drive assembly 252 and a second drive assembly 254. First drive assembly 252 includes a third planetary gear set 256, a first motor 258, and a first motor brake 260. First motor 258 is coupled between third planetary gear set 256 and first motor brake 260 across a first drive shaft 262. First motor brake 260 is selectively operable to facilitate prohibiting an operation of first motor 258. Third planetary gear set 256 includes a third sun gear 264, a plurality of third planet gears 266, a third ring gear 268, and a third planet carrier 270. Third ring gear 268 includes an internal gear arrangement 272 and an external gear arrangement 274. Third sun gear 264 is fixedly coupled to first drive shaft 262 for rotation therewith, and third planet gears 266 are coupled about third sun gear 264 in driving engagement with third sun gear 264. Third ring gear 268 is coupled about third planet gears 266 such that internal gear arrangement 272 is in driving engagement with third planet gears 266. Third planet carrier 270 is coupled between third planet gears 266 and second ring gear 212 such that third planet carrier 270 is rotatable with third planet gears 266 to drive second ring gear 212 into rotation.

Second drive assembly 254 includes a transfer gear set 276, a second motor 278, and a second motor brake 280. Second motor 278 is coupled between transfer gear set 276 and second motor brake 280 across a second drive shaft 282. Second motor brake 280 is selectively operable to facilitate prohibiting an operation of second motor 278. Transfer gear set 276 includes a first transfer gear 284 coupled to second motor 278 by second drive shaft 282, a second transfer gear 286 coupled in driving engagement with first transfer gear 284, and a third transfer gear 288 fixedly coupled to second transfer gear 286 such that second transfer gear 286 and third transfer gear 288 are rotatable together. Third transfer gear 288 is coupled in driving engagement with external gear arrangement 274 of third ring gear 268. In the exemplary embodiment, first drive assembly 252 and second drive assembly 254 function in a dual redundant, speed summed servo-motor arrangement such that second drive assembly 254 is idle while first drive assembly 252 is active, and second drive assembly 254 is activated if first drive assembly 252 is deactivated.

System controller 132 may include any processor-based or microprocessor-based system, such as a computer system, that includes microcontrollers, reduced instruction set circuits (RISC), application-specific integrated circuits (ASICs), logic circuits, and any other circuit or processor that is capable of executing the functions described herein. As used herein, the term "processor" is not limited to only integrated circuits referred to in the art as a processor, but broadly refers to a computer, a microcontroller, a microcomputer, a programmable logic controller, an application specific integrated circuit and any other programmable circuit. Moreover, system controller may be a microprocessor that includes read-only memory (ROM) and/or random access memory (RAM), such as, for example, a 32 bit microcomputer with 2 Mbit ROM, and 64 Kbit RAM.

In the exemplary embodiment, system controller 132 is programmed to communicate with (i.e., receive signals from and/or transmit signals to) a memory 294, a primary traveler position sensor 290, a secondary traveler position sensor 292, a torque sensor 296, a brake sensor 298, first drive assembly 252, second drive assembly 254, and/or a variety of other devices located within the aircraft (e.g., an onboard computer) and/or remotely from the aircraft (e.g., a flight controller) to facilitate performing any of the operations of pitch limiting system 120 described herein. For example, in one embodiment, system controller 132 is programmed to detect and report an operation of pitch limiting system 120 to the onboard computer and/or the flight controller.

In one embodiment, primary traveler position sensor 290 and secondary traveler position sensor 292 function in a dual-redundant arrangement to simultaneously detect a position of second traveler 186. In one embodiment, system controller 132 is programmed to monitor, by communicating with either primary traveler position sensor 290 and/or secondary traveler position sensor 292, a position of second traveler 186 to determine whether second traveler 186 is in a desired position along second lead screw 184 (i.e., whether second traveler 186 is positioned to prevent blade pitch from entering an undesirable range, as described more fully below). In another embodiment, system controller 132 is programmed to compare signals received from primary traveler position sensor 290, secondary traveler position sensor 292, first drive assembly 252, and/or second drive assembly 254 to facilitate detecting an operational status of primary traveler position sensor 290, secondary traveler position sensor 292, first drive assembly 252, and/or second drive assembly 254.

In the exemplary embodiment, torque sensor 296 is mounted proximate housing 116, guide tube 188, or stop cushion spring 250 and detects a movement of guide tube 188 relative to housing 116 (i.e., detects when guide tube 188 absorbs a shock generated by either first traveler 180 or second traveler 186 engaging stop wheel 174). In the exemplary embodiment, brake sensor 298 is mounted proximate brake assembly 128 and/or housing 116 and detects a position of at least one transfer ball 144 (i.e., detects when transfer ball 144 moves into a predetermined position that is associated with an activation of brake 136). In alternative embodiments, system controller 132 may communicate with any number of sensors positioned anywhere throughout system 120.

In operation, to adjust blade pitch in a first direction, pitch adjustment shaft 122 rotates in a first rotational direction to drive pitch adjustment gear assembly 124 (shown in FIG. 1) and rotate blades 110 (shown in FIG. 1). When pitch adjustment shaft 122 is rotated in the first rotational direction, first transfer disc 140 rotates with pitch adjustment shaft 122 and drives second transfer disc 142 and first spur gear 164 via transfer balls 144, inducing rotation of second spur gear 166 and input shaft 172. First sun gear 198, second sun gear 208, and stop wheel 174 rotate with input shaft 172. First lead screw 178 is driven into rotation via first planetary gear set 176 to induce a movement of first traveler 180 toward stop wheel 174 from a first set-point position on first lead screw 178. Second lead screw 184 is driven into rotation via second planetary gear set 182 to induce a movement of second traveler 186 away from stop wheel 174 from a second set-point position on second lead screw 184.

To adjust blade pitch in a second direction, pitch adjustment shaft 122 rotates in a second rotational direction that is different than the first rotational direction to drive pitch adjustment gear assembly 124 and rotate blades 110. When pitch adjustment shaft 122 is rotated in the second rotational direction, first transfer disc 140 rotates with pitch adjustment shaft 122 and drives second transfer disc 142 and first spur gear 164 via transfer balls 144, inducing rotation of second spur gear 166 and input shaft 172. First sun gear 198, second sun gear 208, and stop wheel 174 rotate with input shaft 172. First lead screw 178 is driven into rotation via first planetary gear set 176 to induce a movement of first traveler 180 away from stop wheel 174 from a first set-point position on first lead screw 178. Second lead screw 184 is driven into rotation via second planetary gear set 182 to induce a movement of second traveler 186 toward stop wheel 174 from a second set-point position on second lead screw 184.

In the exemplary embodiment, the first set-point position of first traveler 180 is a position from which a predetermined number of rotations of pitch adjustment shaft 122, in the first rotational direction, would cause first traveler 180 to move into engagement with stop wheel 174, thereby limiting a pitch of blades 110 by stopping the rotation of pitch adjustment shaft 122 via brake assembly 128, as described more fully below. For example, if blade pitch in excess of 90° is undesirable and if it is known that sixty rotations of pitch adjustment shaft 122 in the first rotational direction would change blade pitch to a pitch of 90°, then it is desirable to move first traveler 180 into a position (i.e., the first set-point position) from which sixty rotations of pitch adjustment shaft 122 in the first rotational direction would move first traveler 180 into engagement with stop wheel 174, thereby preventing blade pitch from exceeding 90° by stopping the rotation of pitch adjustment shaft 122 in the first rotational direction after sixty rotations.

In the exemplary embodiment, the second set-point position of second traveler 186 is a position from which a predetermined number of rotations of pitch adjustment shaft 122, in the second rotational direction, would cause second traveler 186 to move into engagement with stop wheel 174, thereby limiting a pitch of blades 110 by stopping the rotation of pitch adjustment shaft 122 via brake assembly 128, as described more fully below. For example, if blade pitch below 30° is undesirable and if it is known that twenty rotations of pitch adjustment shaft 122 in the second rotational direction would change blade pitch to a pitch of 30°, then it is desirable to move second traveler 186 into a position (i.e., the second set-point position) from which twenty rotations of pitch adjustment shaft 122 in the second rotational direction would move second traveler 186 into engagement with stop wheel 174, thereby preventing a blade pitch lower than 30° by stopping the rotation of pitch adjustment shaft 122 in the second rotational direction after twenty rotations.

In the exemplary embodiment, manually rigging first lead screw 178 via worm gear set 206 enables a user to adjust the first-set point position of first traveler 180, and rotating second lead screw 184 via limit adjustment assembly 170 (i.e., via either first motor 258 and/or second motor 278) enables a user to adjust the second set-point position of second traveler 186. In alternative embodiments, the first set-point position and/or the second set-point position may be selected to facilitate preventing a pitch adjustment that either exceeds or lowers blade pitch beyond any limit (i.e., beyond any predetermined flight range and/or predetermined ground range).

If pitch adjustment shaft 122 drives blades 110 toward an undesirable pitch range, such as, for example, beyond 90°, 30°, or −30°, either first traveler 180 or second traveler 186 engages stop wheel 174. By engaging stop wheel 174, first traveler 180 or second traveler 186 stops the rotation of input shaft 172 and transmits a torque through second spur gear 166, through first spur gear 164, and through torque transfer shaft 162 to second transfer disc 142. The torque transmitted to second transfer disc 142 is transferred to first transfer disc 140 through transfer balls 144. If the torque transferred to first transfer disc 140 exceeds a predetermined maximum value (i.e., if the torque generates an axial force that exceeds the predetermined loading of biasing mechanism 134), transfer balls 144 are driven up the inclined sidewall of either first groove 154 and/or second groove 156 to increase the spacing between first transfer disc 140 and second transfer disc 142, such that the axial force is transmitted to brake 136 and urges stator plates 160 into a frictional engagement with rotor plates 158 to stop the rotation of pitch adjustment shaft 122 (i.e., to prevent pitch adjustment shaft 122 from continuing to adjust blades 110 into the undesirable pitch range).

As will be appreciated by one skilled in the art and based on the foregoing specification, the above-described embodiments of the invention may be implemented using computer programming or engineering techniques including computer software, firmware, hardware, or any combination or subset thereof, wherein one technical effect is to facilitate limiting blade pitch. Any resulting program, having computer-readable code means, may be embodied or provided within one or more computer-readable media, thereby making a computer program product, i.e., an article of manufacture, according to the discussed embodiments of the invention. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, and/or by transmitting the code over a network.

The methods and systems described herein facilitate providing a back-up pitch limiting system for use with a rotational pitch adjustment system. The methods and systems described herein also facilitate providing a lower weight pitch limiting system that is capable of being mounted in a non-rotating area of the engine to facilitate minimizing an application of centrifugal stresses and/or thermal stresses to the pitch limiting system. As such, the methods and systems described herein facilitate providing a cost-effective and reliable system for assisting a pitch adjustment system with maintaining blade pitch within a given range.

Exemplary embodiments of methods and systems for limiting blade pitch are described above in detail. The methods and systems for limiting blade pitch are not limited to the specific embodiments described herein, but rather, components of the methods and systems may be utilized independently and separately from other components described herein. For example, the methods and systems described herein may have other industrial and/or consumer applications and are not limited to practice with gas turbine engine fan blades, as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A method for limiting blade pitch, said method comprising:
   providing a brake assembly that is actuatable to limit blade pitch;
   providing a limit stop assembly including a stop wheel and a traveler movable relative to the stop wheel;
   coupling the limit stop assembly to the brake assembly such that the limit stop assembly actuates the brake assembly when the traveler engages the stop wheel;
   providing a sensor configured to detect a position of the traveler; and
   providing a system controller configured to at least one of communicate with the sensor to monitor a position of the traveler and actuate the motor to adjust the position of the traveler relative to the stop wheel.

2. A method in accordance with claim 1, further comprising providing a motor configured to adjust a position of the traveler relative to the stop wheel.

3. A method in accordance with claim 1, wherein providing a limit stop assembly comprises providing a gear set configured to enable manual adjustment of a position of the traveler relative to the stop wheel.

4. A method in accordance with claim 1, wherein providing a brake assembly comprises providing a brake assembly that includes a first transfer disc, a second transfer disc, and at least one transfer ball positioned between the first transfer disc and the second transfer disc such that a movement of the at least one transfer ball actuates the brake assembly by separating the first transfer disc from the second transfer disc.

5. A method in accordance with claim 1, wherein providing a brake assembly comprises providing a brake assembly that includes a plurality of rotor plates and a plurality of stator plates, wherein a movement of the rotor plates into frictional engagement with the stator plates actuates the brake assembly.

6. A method in accordance with claim 1, wherein providing a limit stop assembly comprises providing a limit stop assembly that includes a guide tube that facilitates guiding a movement of the traveler relative to the stop wheel.

7. A method in accordance with claim 6, wherein providing a limit stop assembly that includes a guide tube comprises providing a guide tube that has a plurality of internal splines, and wherein providing a limit stop assembly that includes a stop wheel and a traveler comprises a providing a traveler that includes a plurality of external splines, the traveler positioned within the guide tube such that the external splines engage the internal splines to facilitate guiding a movement of the traveler along the guide tube.

8. A method in accordance with claim 1, wherein providing a limit stop assembly comprises providing a limit stop assembly that includes a lead screw, the traveler movable relative to the stop wheel along the lead screw.

9. A method in accordance with claim 8, wherein providing a limit stop assembly comprises:
providing an input shaft;
providing a gear set; and
coupling the gear set between the input shaft and the lead screw such that rotation of the input shaft induces rotation of the lead screw via the gear set to move the traveler along the lead screw.

10. A system for limiting blade pitch, said system comprising:
a brake assembly that is actuatable to limit blade pitch; and
a limit stop assembly comprising a stop wheel and a traveler movable relative to said stop wheel, and a guide tube that facilitates guiding a movement of said traveler relative to said stop wheel, wherein said limit stop assembly is coupled to said brake assembly such that said limit stop assembly actuates said brake assembly when said traveler engages said stop wheel.

11. A system in accordance with claim 10, further comprising a motor configured to adjust a position of said traveler relative to said stop wheel.

12. A system in accordance with claim 10, wherein said limit stop assembly further comprises a gear set configured to enable manual adjustment of a position of said traveler relative to said stop wheel.

13. A system in accordance with claim 10, further comprising:
a sensor configured to detect a position of said traveler; and
a system controller configured to at least one of communicate with said sensor to monitor a position of said traveler and actuate said motor to adjust the position of said traveler relative to said stop wheel.

14. A system in accordance with claim 10, wherein said brake assembly comprises a first transfer disc, a second transfer disc, and at least one transfer ball positioned between said first transfer disc and said second transfer disc such that a movement of said at least one transfer ball actuates said brake assembly by separating said first transfer disc from said second transfer disc.

15. A system in accordance with claim 10, wherein said brake assembly comprises a plurality of rotor plates and a plurality of stator plates, wherein a movement of said rotor plates into frictional engagement with said stator plates actuates said brake assembly.

16. A system in accordance with claim 10, wherein said guide tube comprises a plurality of internal splines, and wherein said traveler comprises a plurality of external splines, said traveler positioned within said guide tube such that said external splines engage said internal splines to facilitate guiding a movement of said traveler along said guide tube.

17. A system in accordance with claim 10, wherein said limit stop assembly comprises a lead screw, said traveler movable relative to said stop wheel along said lead screw.

18. A system in accordance with claim 17, wherein said limit stop assembly further comprises:
an input shaft; and
a gear set coupled between said input shaft and said lead screw such that rotation of said input shaft induces rotation of said lead screw via said gear set to move said traveler along said lead screw.

\* \* \* \* \*